United States Patent [19]
Hickerson

[11] Patent Number: 5,468,114
[45] Date of Patent: Nov. 21, 1995

[54] LOADING DEVICE FOR PICK-UP TRUCKS

[76] Inventor: Scott J. Hickerson, P.O. Box 337, Thief River Falls, Minn. 56701

[21] Appl. No.: 263,371

[22] Filed: Jun. 20, 1994

[51] Int. Cl.⁶ .................................................. B62D 33/03
[52] U.S. Cl. ............................. 414/537; 296/61; 14/71.1
[58] Field of Search ..................................... 414/522, 539, 414/480, 537, 538; 296/50, 51, 57.1, 61, 174, 175, 170, 171; 14/69.5, 71.1, 2.4

[56] References Cited

U.S. PATENT DOCUMENTS

| | | |
|---|---|---|
| 3,642,156 | 2/1972 | Stenson . |
| 3,726,423 | 4/1973 | Miron . |
| 3,834,565 | 9/1974 | Goodman, Jr. et al. . |
| 3,977,545 | 8/1976 | Lloyd . |
| 4,624,619 | 11/1986 | Uher . |
| 4,685,857 | 8/1987 | Goeser et al. . |
| 4,900,217 | 2/1990 | Nelson ........................ 414/537 |
| 4,906,041 | 3/1990 | McKenzie . |
| 4,932,829 | 6/1990 | Miller . |
| 4,979,865 | 12/1990 | Strickland . |
| 5,156,432 | 10/1992 | McCleary ............................. 414/537 X |
| 5,244,335 | 9/1993 | Johns . |
| 5,257,894 | 11/1993 | Grant ........................ 414/537 |
| 5,273,335 | 12/1993 | Belnap et al. ........................ 414/537 X |

FOREIGN PATENT DOCUMENTS 2293334  7/1976  France ................................. 414/537

Primary Examiner—Frank E. Werner
Attorney, Agent, or Firm—Schroeder & Siegfried

[57] ABSTRACT

A loading device to be fixedly secured to the bed of a pick-up truck for loading and unloading vehicles into and from the bed thereof, which includes a pair of transversely spaced parallel slideways within a rectangular metal frame and a pair of pivotally connected, in tandem, rigid ramp sections, the forward one of said ramp sections being slidably mounted within said slideways and the other more rearward one being swingable to a vertical position and connectable thereat to the conventional latching mechanism at the rear end of the side walls of a pick-up truck. Devices are also provided for releasably securing said more rearward ramp section, when in loading position, in an extended planar relation with the slidable forward ramp section to cooperatively provide a single planar ramp to the bed of a pick-up truck. The more rearward ramp section functions as a tailgate for the pick-up truck when received in said vertical position and so secured to the conventional latch mechanism at the rear end of the sidewalls of the pick-up truck.

16 Claims, 14 Drawing Sheets

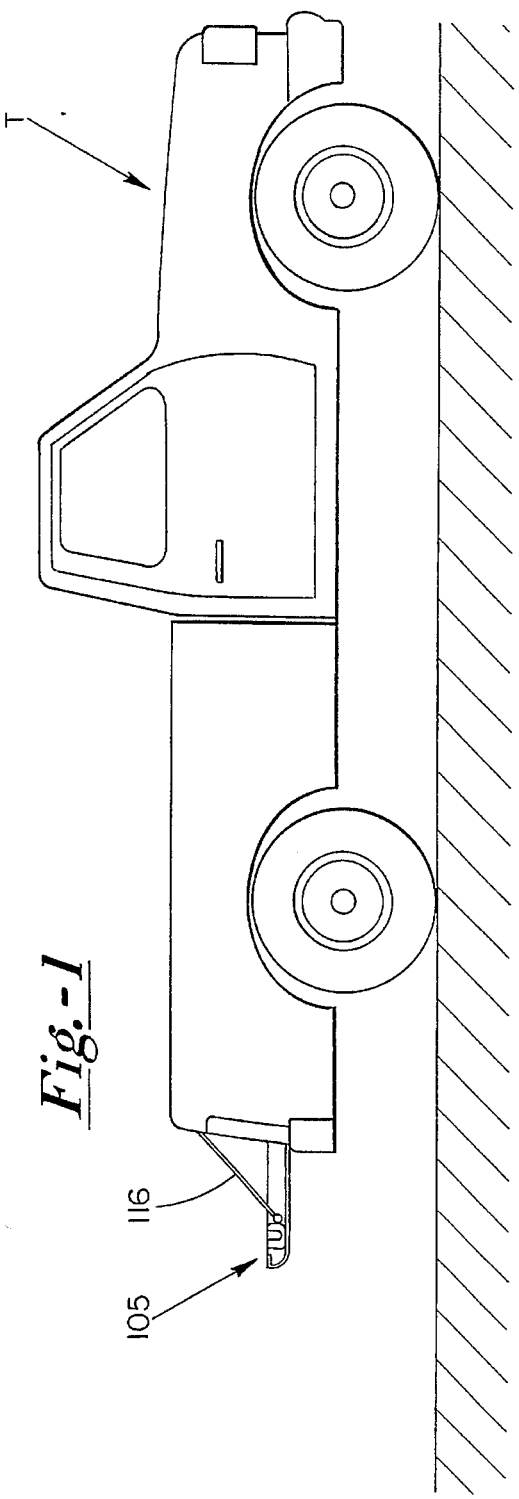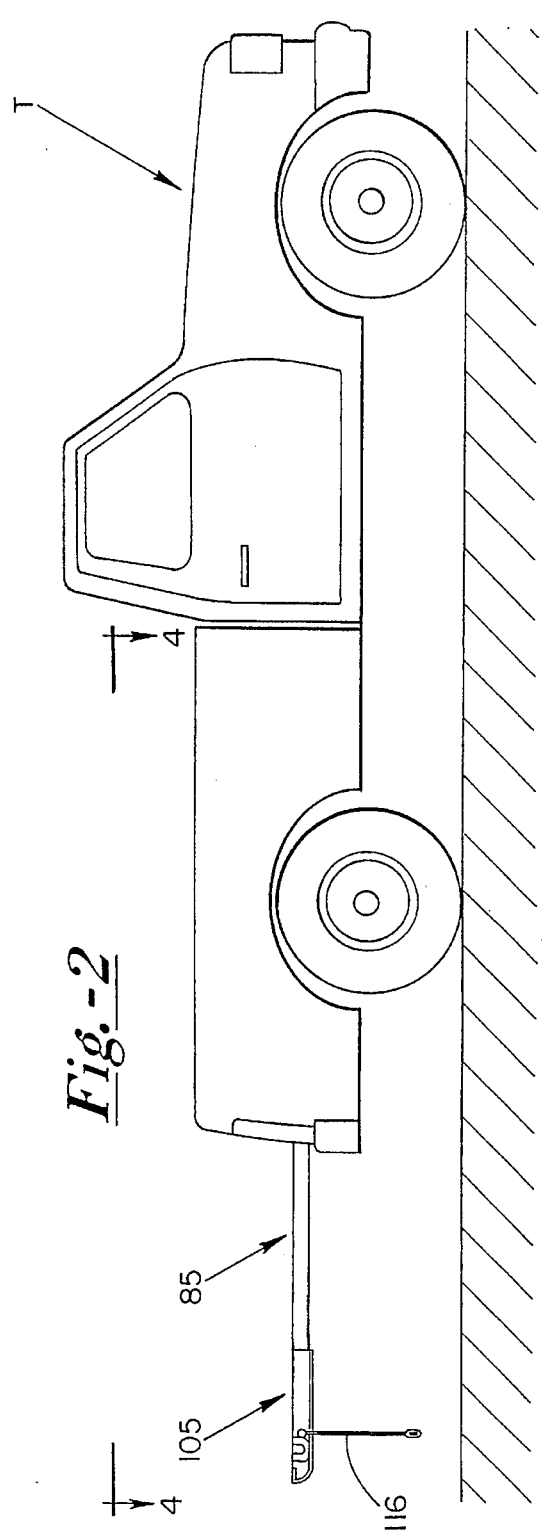

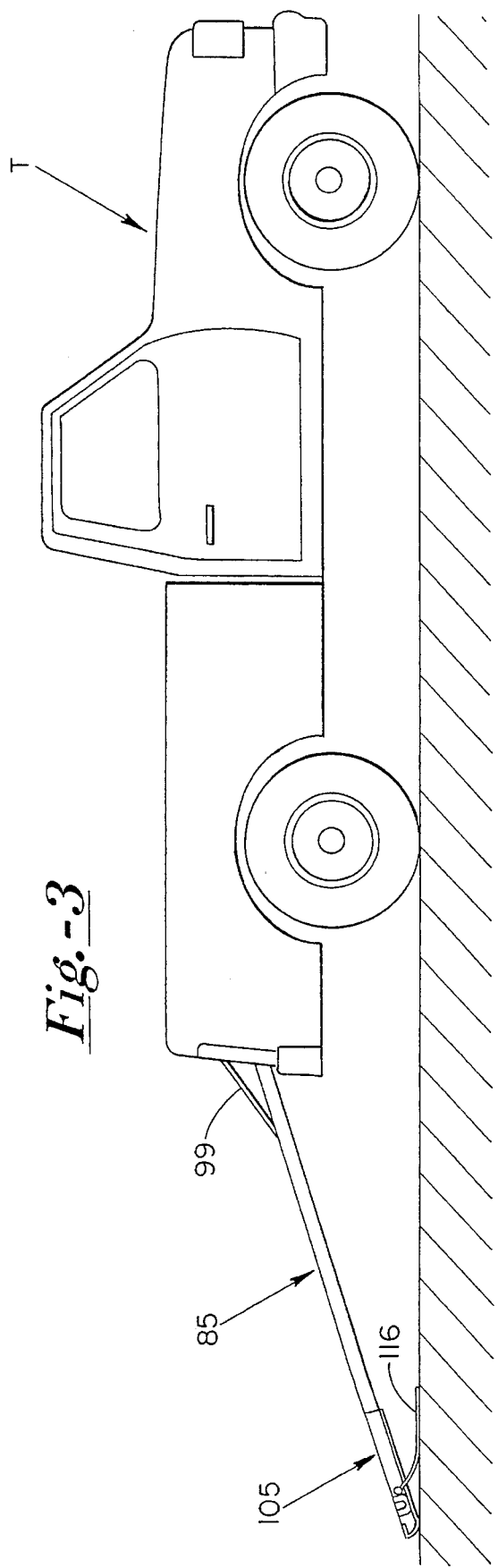

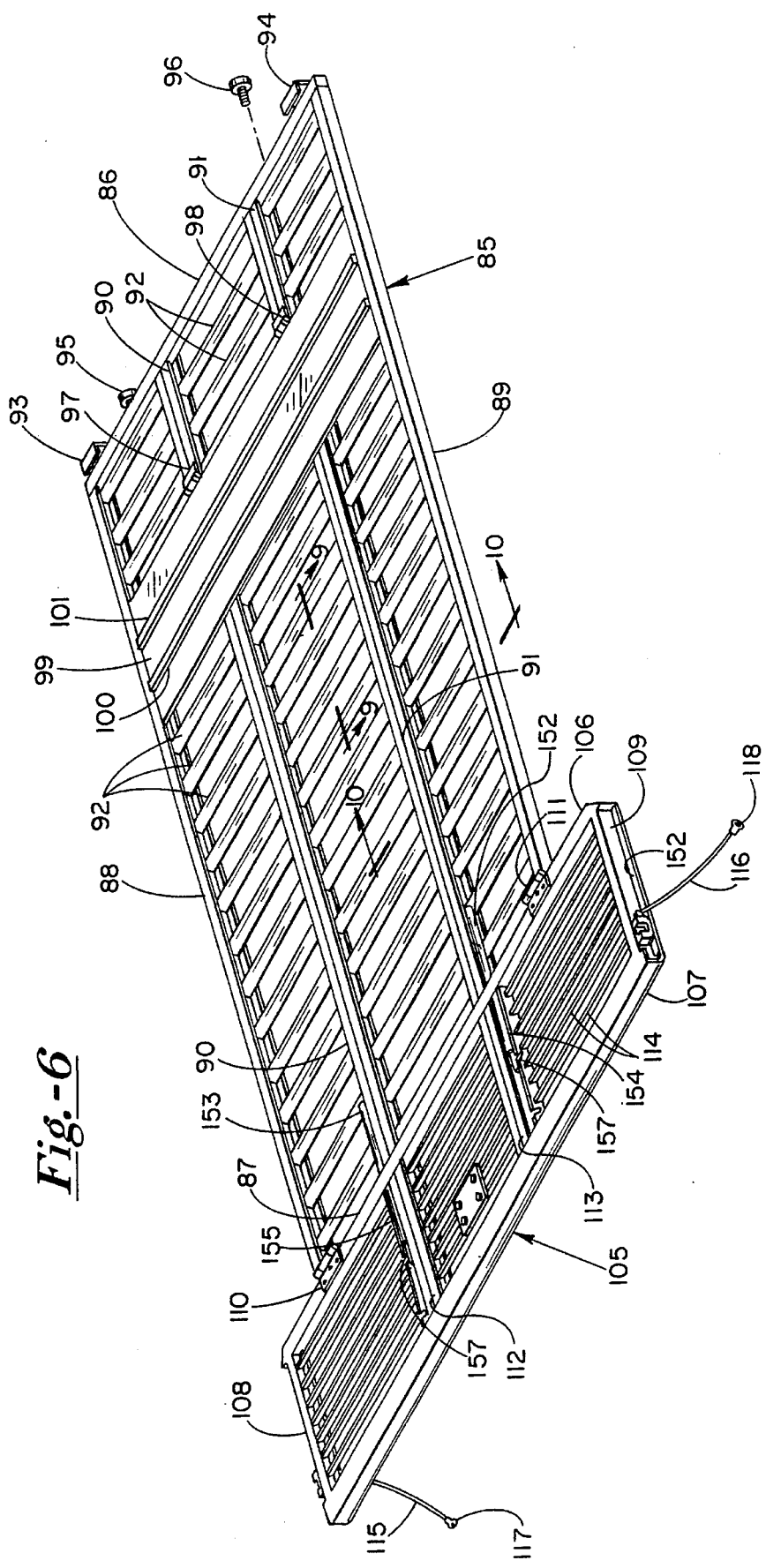

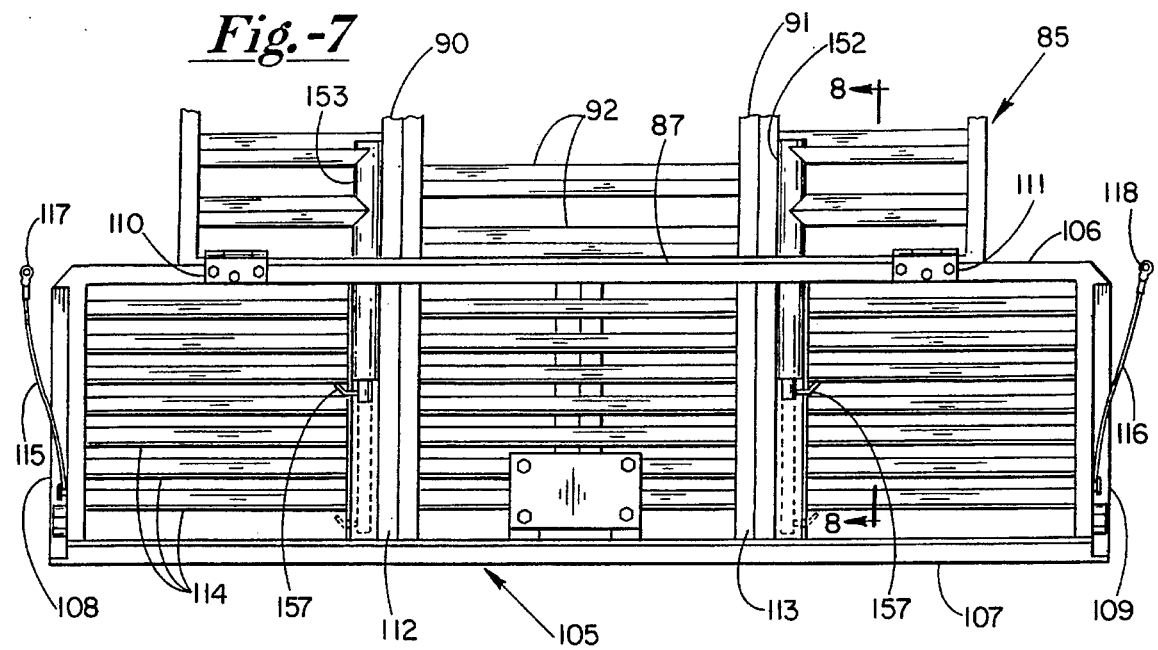
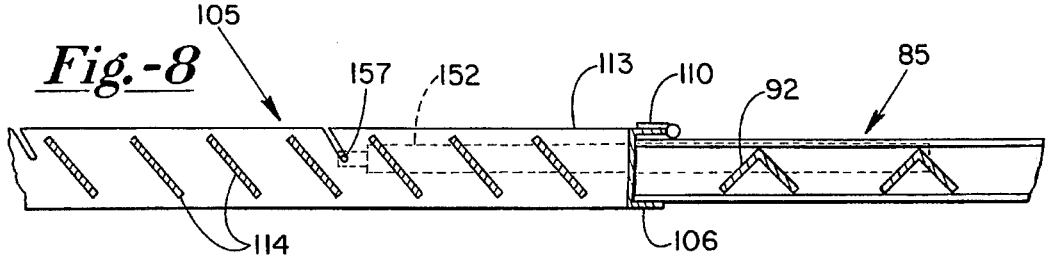
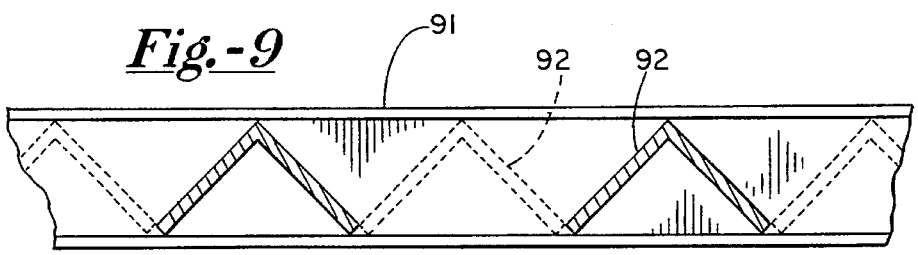
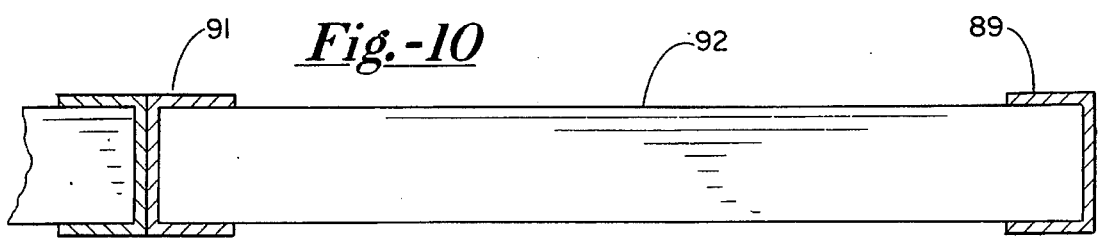

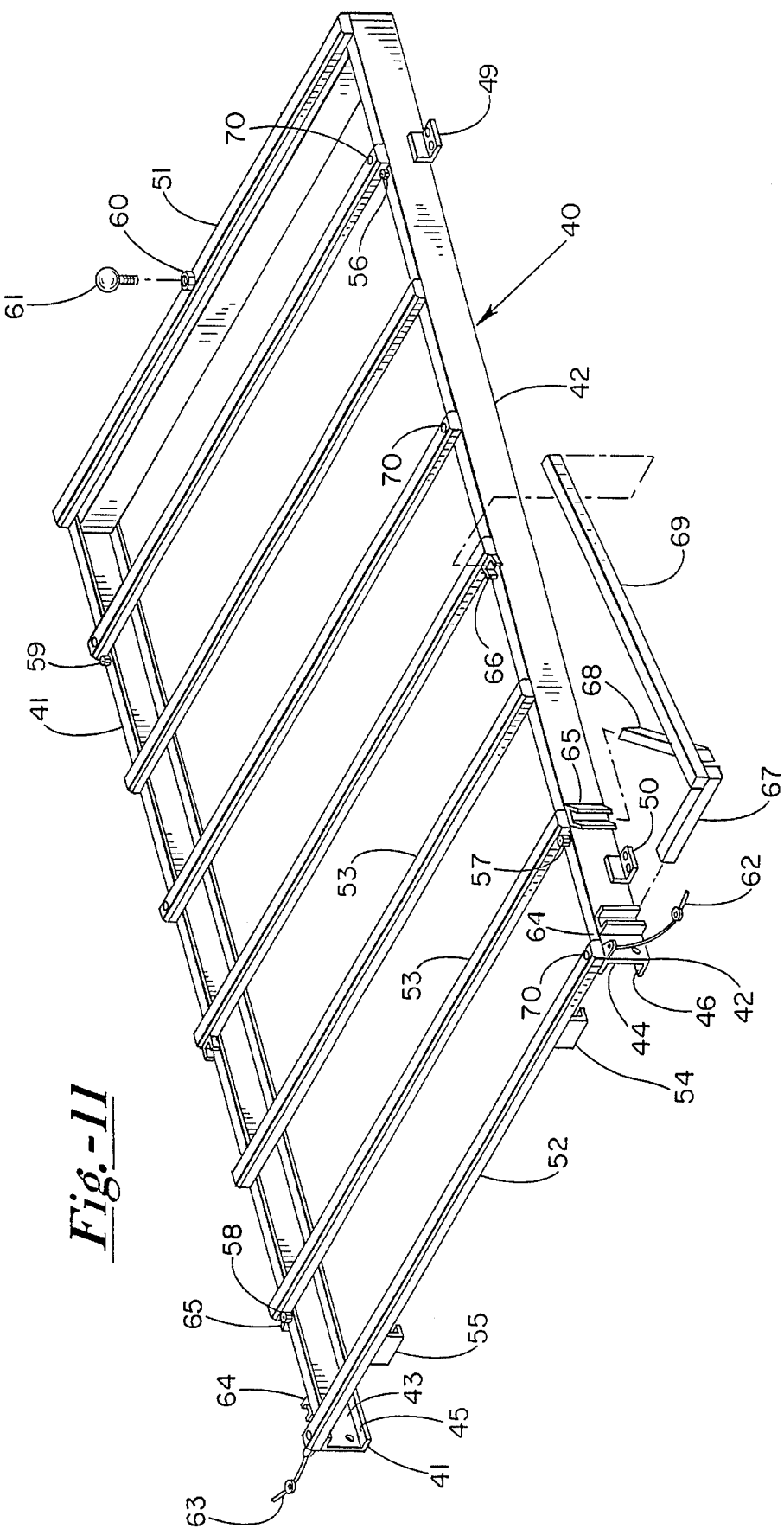

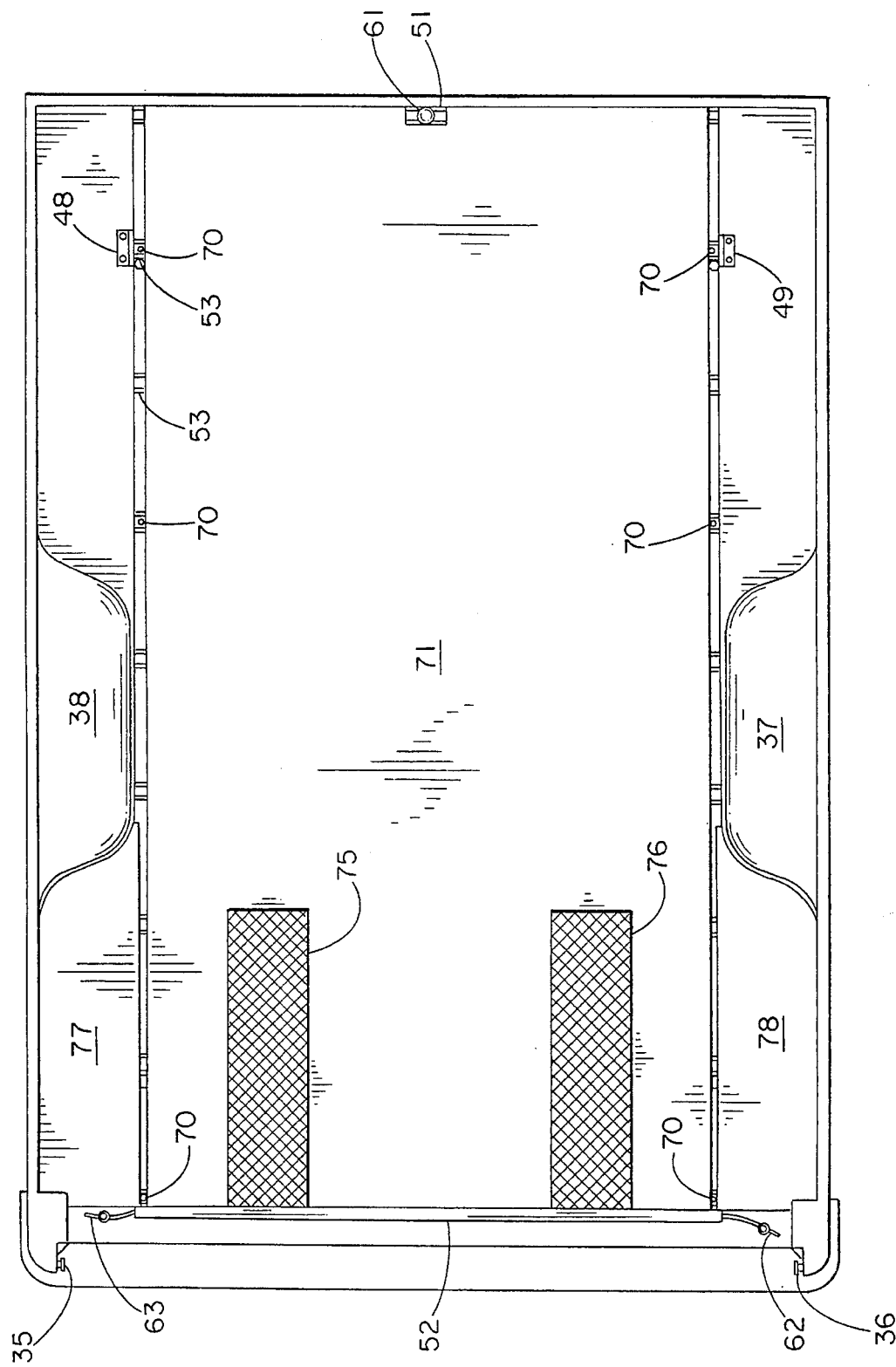

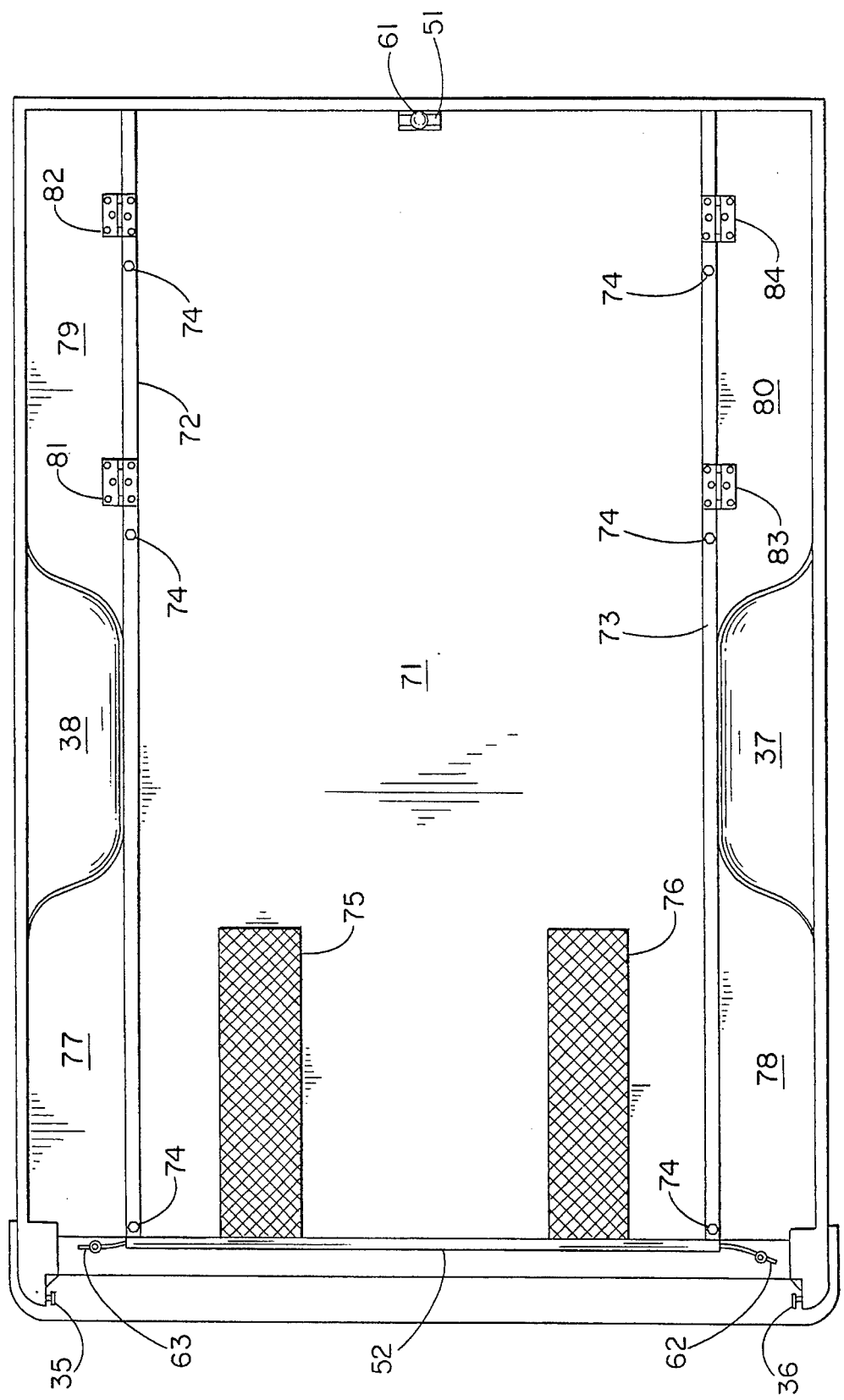

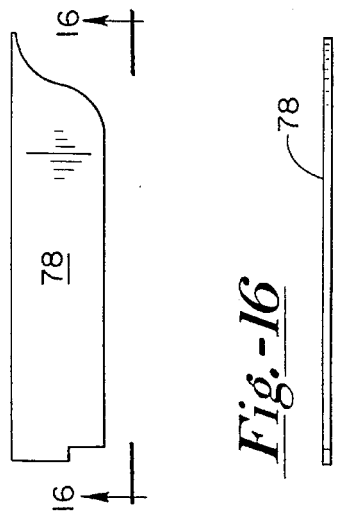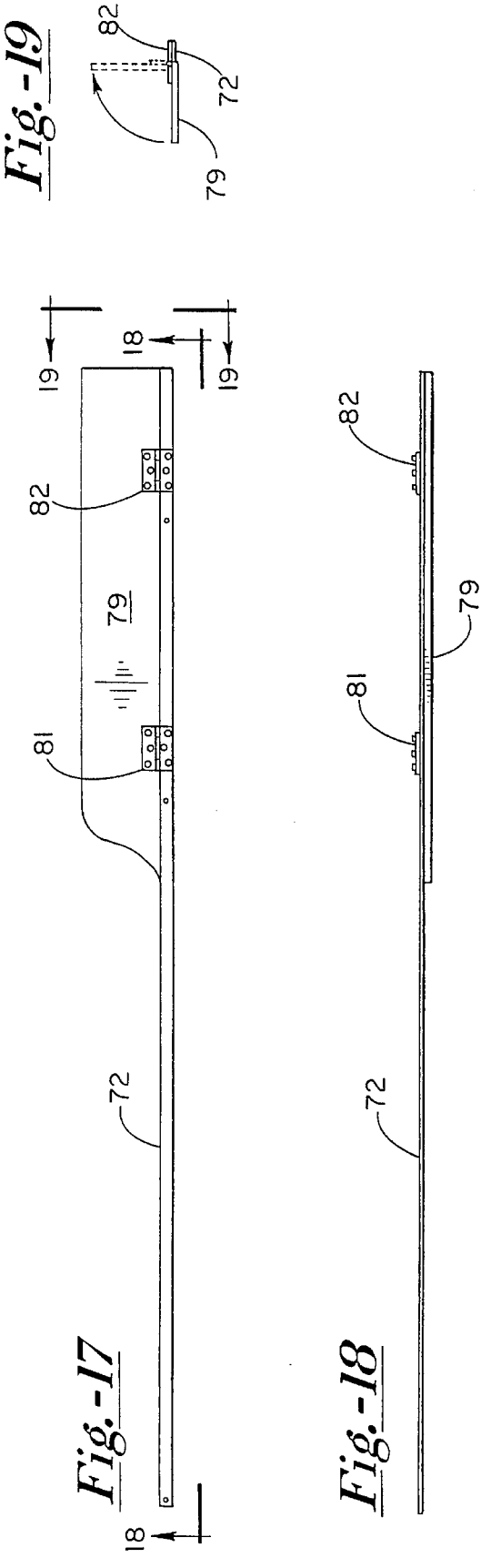

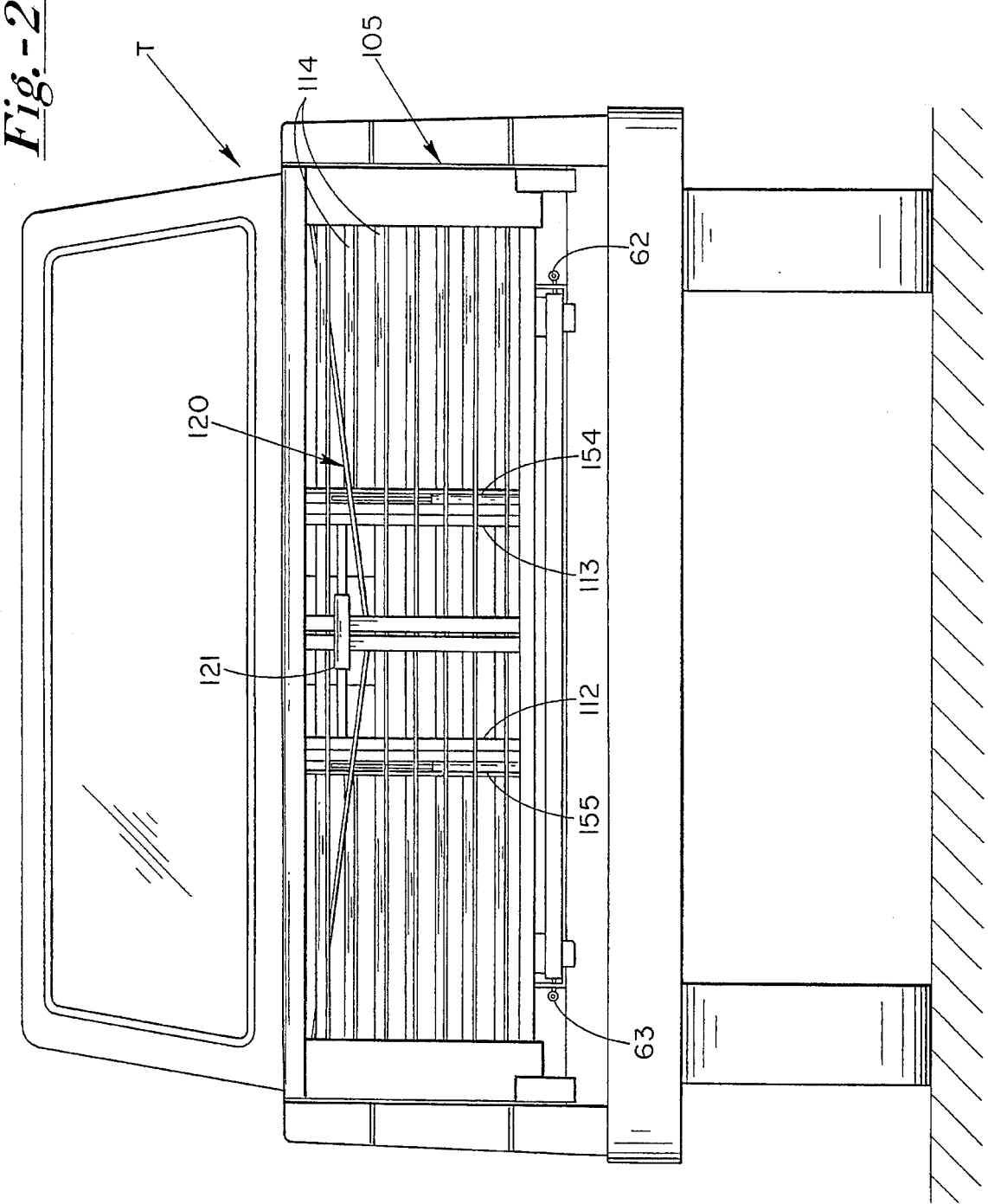

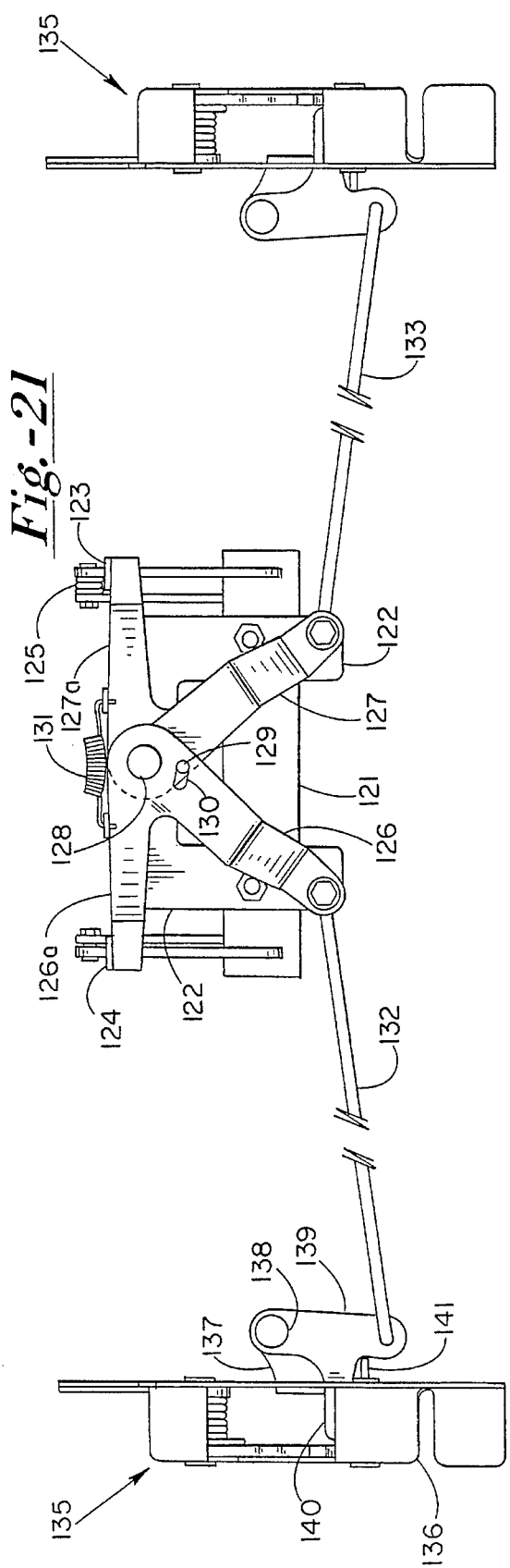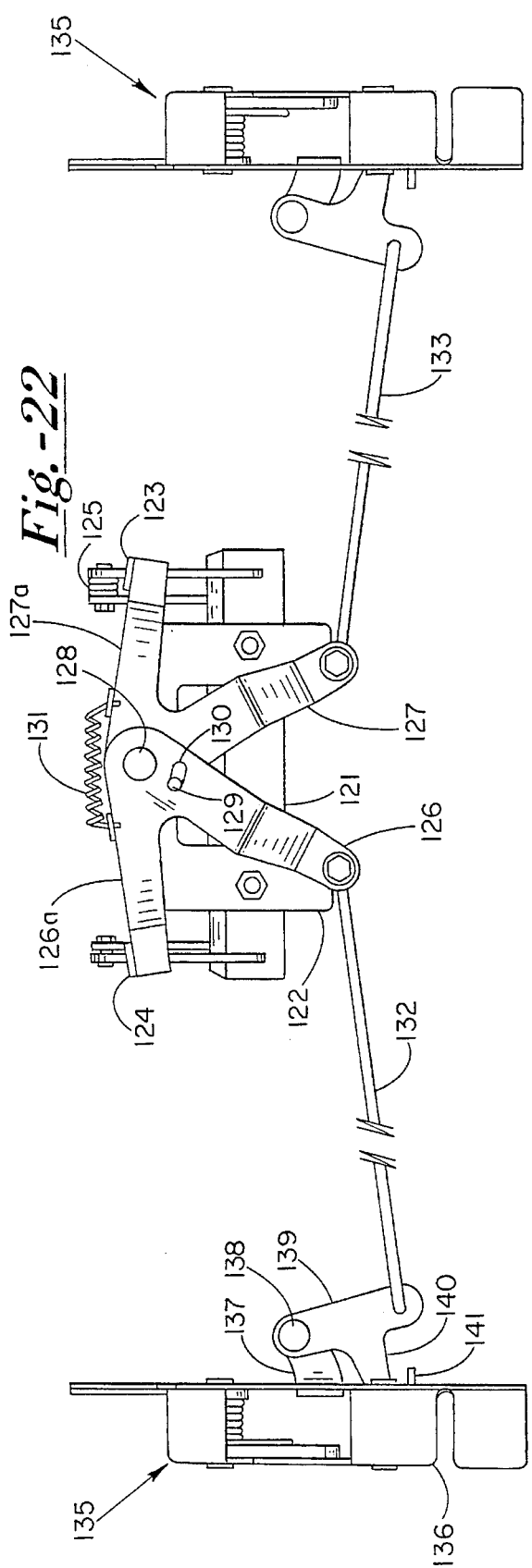

LOADING DEVICE FOR PICK-UP TRUCKS

DESCRIPTION

BACKGROUND OF THE INVENTION

This invention relates to apparatus for facilitating the loading and unloading of vehicles such as snowmobiles into and from the rear end of a pick-up truck. It is comprised of a rigid frame which is fixedly secured to the bed of the truck and has a pair of transversely spaced slideways within which the forward one of two pivotally connected ramp sections slides. The second and rearward ramp section functions as an extension of the slidable ramp section when in loading position and as a tailgate for the truck when both sections are in stored position.

Many others have formerly proposed various devices to facilitate loading and unloading of such vehicles into the rear of a pick-up truck. Some of these have used ramps which slide outwardly from a stored position to an extended loading position. Some have used telescoping or nesting ramp sections. Most of them are relatively complicated and involve substantial modification of the pick-up truck. Insofar as it is known, none have provided such a device which functions both as a simple ramp and as a tailgate while using the standard equipment found upon most pick-up trucks.

U.S. Pat. No. 4,685,857 shows a ramp section which is slidable rearwardly to an extended position at which it can pivot downwardly to function as a ramp. It is carried, however, by a platform assembly which is slidable upon a base assembly, the latter being fixed to the bed of the truck. Thus, it is a relatively complicated and extensive arrangement and makes no provision for a ramp section functioning as a tailgate for the truck.

U.S. Pat. No. 3,834,565 shows a retractable two-section ramp which is hinged at its front end to the rear end of a trailer. The ramp sections require supporting legs and a cylinder is provided to pivot the forward ramp section to a vertical position, as shown in FIG. 2.

U.S. Pat. No. 3,642,156 shows a folding ramp the sections of which are progressively narrower toward the rear and which telescope within each other as they move to folded position.

Thus, as shown by the above patents, prior art assemblies produced for similar purposes are relatively complicated and expensive. None suggest the use of a two-section ramp slidable within a frame assembly and utilizing the rear section as a tailgate for the pick-up truck.

BRIEF SUMMARY OF THE INVENTION

The invention provides a rectangular metal frame assembly which has a pair of transversely spaced parallel slideways and is fixedly connected to the bed of a pick-up truck in superimposed relation thereto. Slidably mounted within the slideways is a forward ramp section which extends along substantially the full length of the frame assembly and slides outwardly to an extended loading position. Pivotally connected to the rear end of the forward ramp section is a substantially shorter second ramp section which can be swung upwardly and latched into the conventional latching mechanism carried by most standard pick-up trucks at the upper rear end portions of the truck side walls, at which position it functions as a tailgate for the pick-up truck when the ramp sections are in loaded position. Means is provided for securing this second ramp section in extended planar relation to the forward ramp section when the two are in extended loading position. Cooperative abutment means is also provided at the rear end of the frame assembly and the front end of the forward ramp section for arresting the rearward sliding motion of the latter at the rear of the frame assembly and for permitting that section to pivot downwardly about a transverse axis to a loading position.

BRIEF DESCRIPTION OF THE DRAWINGS

These and other objects and advantages of the invention will more fully appear from the following description, made in connection with the accompanying drawings, wherein like reference characters refer to the same or similar parts throughout the several views, and in which:

FIG. 1 is a side elevational view of a pick-up truck having one of my loading devices installed thereon and with the outer ramp extended;

FIG. 2 is a side elevational view of the same truck with the two ramps of my loading device partially extended rearwardly;

FIG. 3 is a side elevational view of the same truck with my loading device in fully extended loading position;

FIG. 6 is a perspective view of the ramp portions of my loading device;

FIG. 7 is a partial plan view of the rear portion of the forward ramp and the rearward ramp of my loading device;

FIG. 8 is a sectional view on an enlarged scale taken along line 8—8 of FIG. 7;

FIG. 9 is a fragmentary sectional view on an enlarged scale, taken along line 9—9 of FIG. 7;

FIG. 10 is a fragmentary sectional view taken along line 10—10 of FIG. 6;

FIG. 11 is a perspective view of the slideway frame in which the forward ramp of my loading device is stored;

FIG. 13 is a top plan view of the platform which is superimposed upon the slideway frame, with all of the side covers in place;

FIG. 14 is a top plan view of my loading device in stored position, with the rear side covers removed;

FIG. 15 is a plan view of one of the rear side covers of my loading device;

FIG. 16 is a side elevational view taken along line 15—15 of FIG. 15;

FIG. 17 is a plan view of one of the front side covers of my loading device with the platform-retainer strip by which it is secured;

FIG. 18 is a side elevational view taken along line 18—18 of FIG. 17;

FIG. 19 is an end elevational view taken along line 19—19 of FIG. 17;

FIG. 20 is a rear end elevational view of my loading device in stored or loaded position, with the rearward ramp secured in tail-gate-functioning position;

FIG. 21 is a schematic elevational view of the release handle linkage and latch mechanism which secures the rear ramp in tail-gate-functioning position, the latch mechanism being in latched position;

FIG. 22 is a schematic elevational view of the mechanism shown in FIG. 21 with the latch mechanism in an unlatched position;

DETAILED DESCRIPTION OF THE INVENTION

Figure 4:
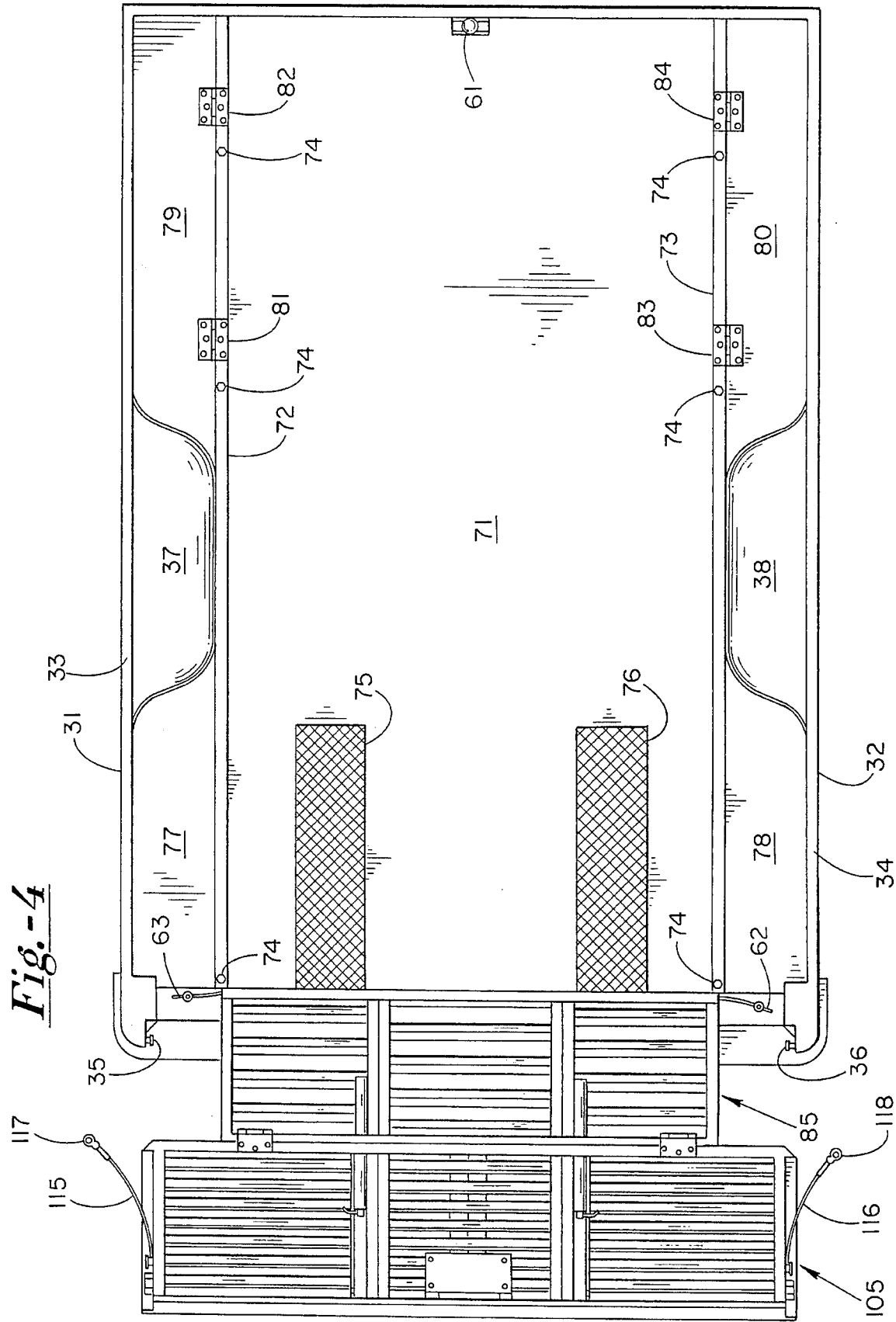
FIG. 4 is a top plan view taken along line 4—4 of FIG. 2.
Figure 5:
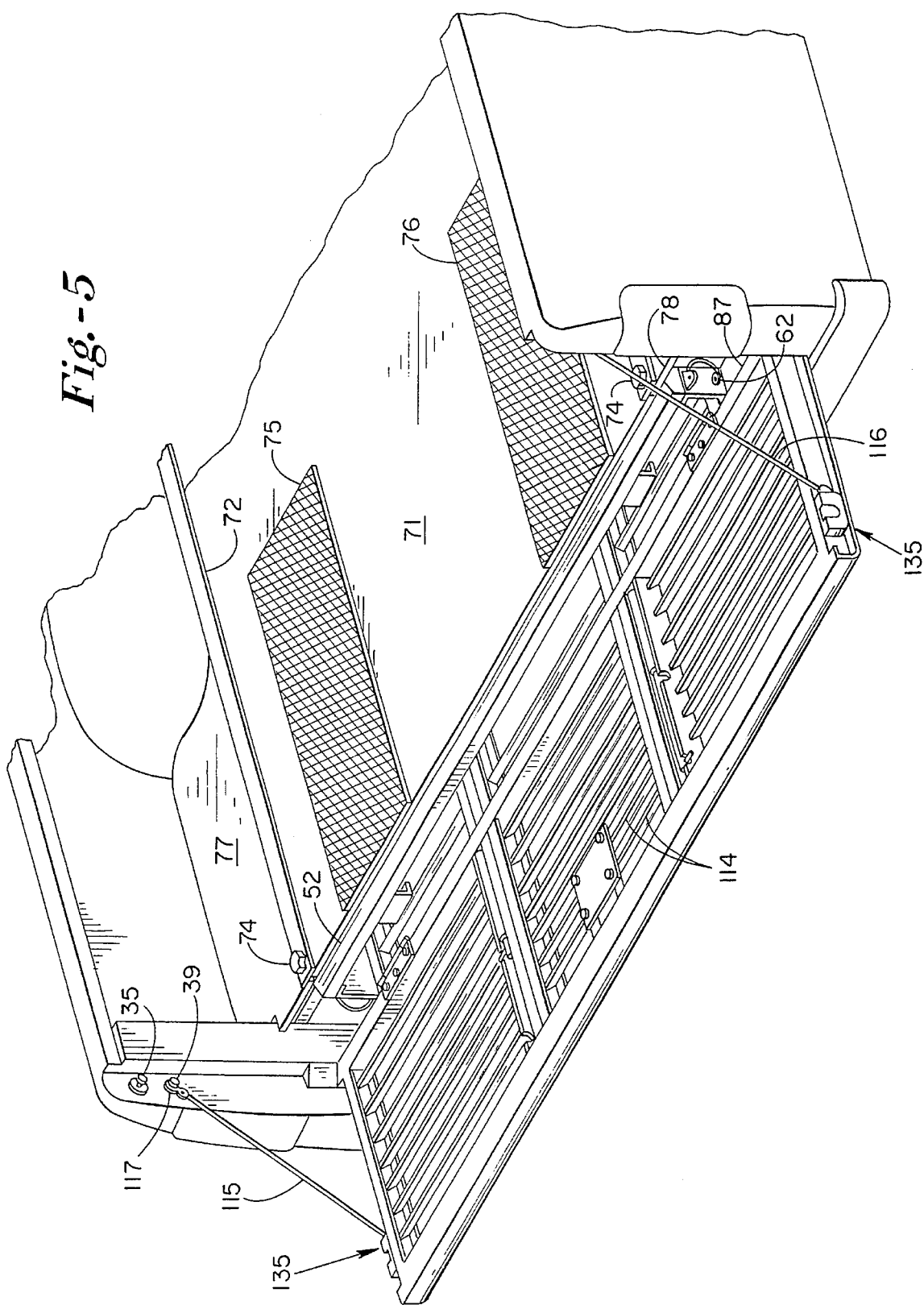
FIG. 5 is a perspective view looking forwardly from behind the truck with my loading device in the position shown in FIG. 1.

The preferred embodiment of my invention is shown in FIGS. 1–26, inclusive. As shown, it is a device for facilitating the loading and unloading of vehicles into the rear end of a pick-up truck such as is shown in the drawings and is designated by the letter T. As shown, it has an elongated load bearing bed 30 and opposite upstanding sides 31 and 32 which are defined by a pair of rearwardly extending sidewalls 33, 34. One each of a pair of headed latch pins 35, 36 is carried at the rear end of each sidewall. Wheel covers 37, 38 are shown. Anchor pins, such as indicated by the numeral 39 in FIG. 5, are mounted immediately below each of the latch pins 35 and 36. The pick-up truck shown is of the 1988 Ford F Series model and the latch mechanism, which will be described hereinafter, is identical to and taken from the tailgate of such a pick-up truck.

Figure 12:
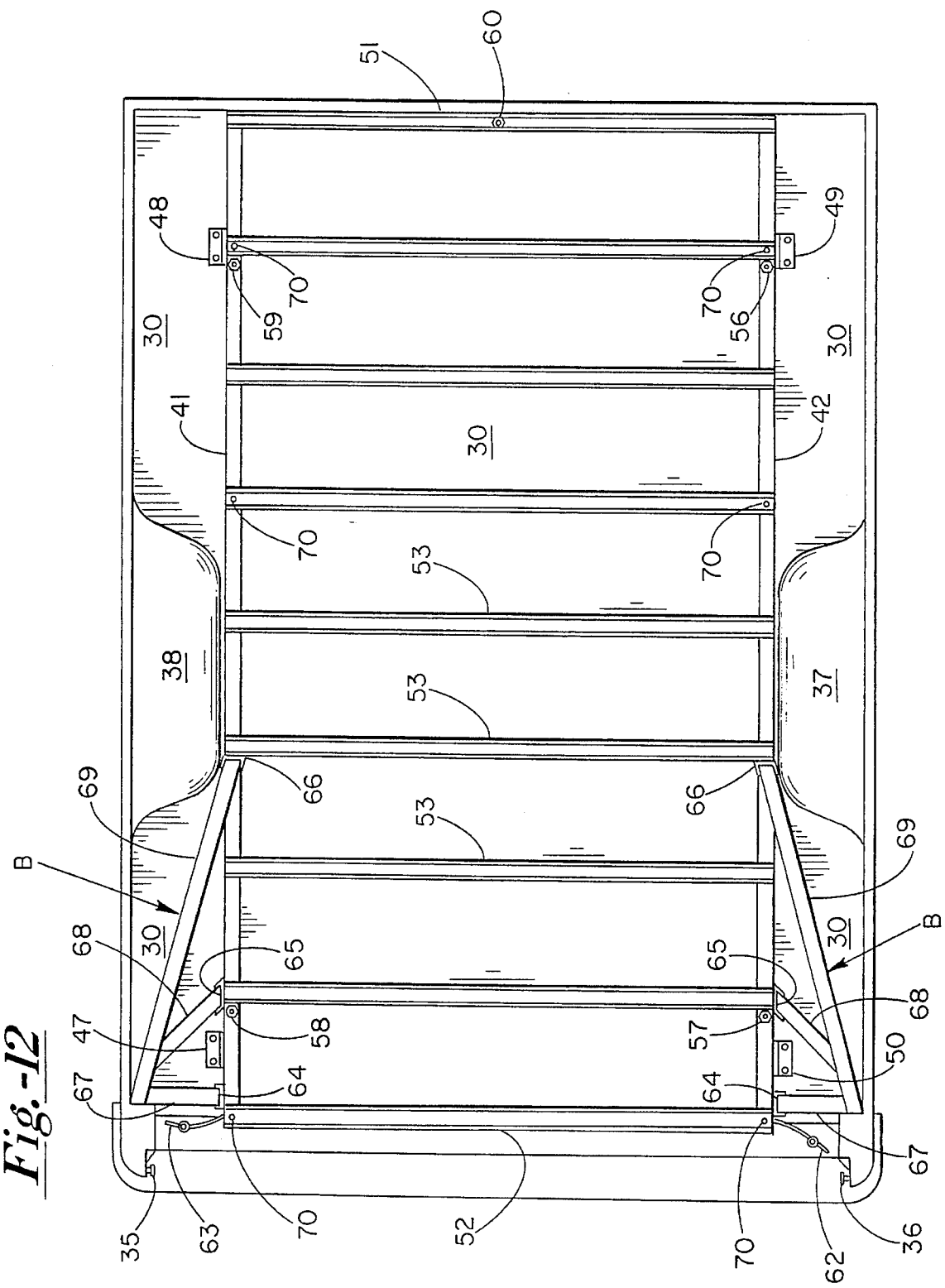
FIG. 12 is a top plan view of the slideway frame with its bracing studs in place.
Figure 23:
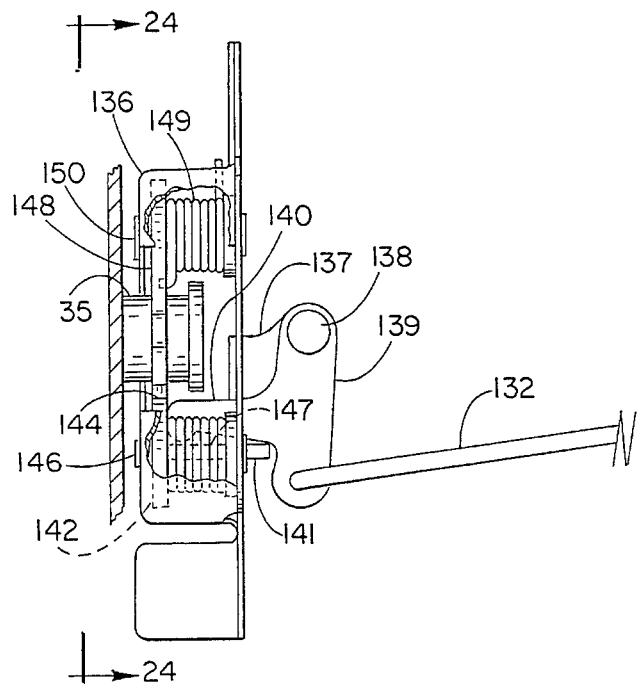
FIG. 23 is an elevational view of the latch on the rear ramp, in an unlatched position.

As shown, the invention includes a generally rigid, rectangular frame assembly 40 which is best shown in FIG. 11. It includes a pair of inwardly facing transversely spaced sidebars 41 and 42 which are U-shaped in cross-section and face inwardly toward each other. The lower leg of each of the sidebars 41 and 42 define parallel slideways 43 and 44, respectively. The upper surface of the lower legs of each of the slideways is covered with a strip of high density plastic 45, 46, respectively, throughout their length. Each sidebar 41, 42 is fixedly connected to the bed of the truck T by a plurality of short pieces of angle iron identified in the drawings by the numerals 47–50, inclusive (see FIG. 12). As shown, one side of each is welded to the outer surface of the U-shaped cross-section and the other of which is bolted to the bed as shown in FIG. 12.

The frame also includes front crossbar 51 and rear crossbar 52 plus intermediately spaced crossbars, each of which is identified by the numeral 53. Each of the intermediate crossbars is welded to the upper leg of each of the sidebars to provide spaced transversely extending struts. As best shown in FIG. 11, hook members 54 and 55 are welded to the under surface of the rear crossbar of the frame to limit the rearward movement of the ramp section which moves within the slideways as hereinafter described. As also best shown in FIG. 11, threaded nuts 56, 57, 58 and 59 are welded to the upper leg of the U-shaped slideways to provide means for securing a wooden cover, as hereinafter described, to the upper surface of the frame 40. As also shown in FIG. 11, a nut 60 is welded to the upper surface of the front crossbar 51 at a point equidistant from the sidebars to accommodate a threaded ball 61 which is provided for use as a part of a ball and socket (not shown) arrangement in conjunction with a winch for drawing the heavier vehicles upwardly into and upon the bed of the truck.

Lock pins 62 and 63 are connected by flexible means to each of the rear corners of the frame 40 in position to be inserted into the holes provided therefor in sidebars 41, 42, as best shown in FIG. 11, in order to lock the forwardmost ramp section in stored position.

Each of the rear corners of the frame 40 is provided with three separate sockets which are identified by the same numerals 64, 65 and 66 at each of said corners. These sockets are designed to accept the free end of brace legs 67, 68 and 69 which are connected at their outer ends, as shown, by welding. When the brace legs 67–69 are positioned, as shown in FIG. 12, they effectively function to preclude the frame from tearing loose from the bed of the truck, which might otherwise occasion when a winch is applied to the ball 61. The outermore portions of each of the brace legs at their rear ends bear against the interior of the sidewall of the truck, as best shown in FIG. 12.

As also best shown in FIG. 12, a plurality of tap holes, identified by the numeral 70, are formed in the outer ends of two of the intermediate crossbars 53 and the rear crossbar 52. These tap holes are provided to accept bolts which extend downwardly through a retaining strap, such as indicated by the numerals 72 and 73, each of which bears upon the upper surface of a wooden cover 71. These bolts are identified by the numeral 74 in FIG. 14. In addition, traction strips 75 and 76 are applied to the upper surface of the cover 71 in order to provide maximum traction for the powered wheels of the vehicles as they enter the rear end of the truck.

As best shown in FIG. 13, a pair of rear side panels 77 and 78, which are also made of wood, is provided. These can also be seen in FIG. 5. FIG. 14 shows a pair of front panels 79 and 80, the former of which is secured by hinges 81 and 82 to the upper surface of the retaining strap 72, while hinges 83 and 84 secure the remaining front panel 80 to retaining strap 73. This can also be seen by reference to FIG. 4.

Mounted within the frame 40, in sliding relative relation, is a forward ramp section indicated generally by the numeral 85. As shown in FIG. 6, it has a forward crossbar 86 and a rear crossbar 87 with two sidebars 88 and 89 extending therebetween. Each of the crossbars and sidebars are U-shaped in cross-section. In addition, there are two longitudinally extending intermediate struts 90 and 91, each of which is comprised of a pair of U-shaped channel members welded with their webs back to back. Angle iron sections 92 extend therebetween into the interior of the U-shaped constructions and are welded thereto to provide the necessary strength and are best shown in cross-section in FIGS. 8–9.

A pair of movement limiting L-shaped hook members 93 and 94 are welded to the front crossbar 86 in alignment with the hook members 54 and 55 of the frame assembly 40. As shown, they face rearwardly and are positioned so that, when the forward ramp section 85 is moved to its loading position, the hook members 93 and 94 will engage the abutment members 54 and 55 of the frame assembly. As is best shown in FIG. 6, a pair of rubber bumpers 95 and 96 are mounted upon threaded members which extend into the front crossbar 86 in threaded openings provided therefor.

As also best shown in FIG. 6, a pair of hinges 97 and 98 are welded upon the upper surface of the struts 90 and 91 a short distance rearwardly of the front end of the front ramp section 85. An auxiliary ramp 99 is welded to one of the hinged sections of each hinge so that the auxiliary ramp can be pivoted upwardly and forwardly to a position at which it extends slightly over the juncture of the forward ramp sections 85 with the rear end of the frame 40 when the forward ramp section 85 is in loading position. A pair of transverse strengthening bars 100 and 101 are welded to the upper surface of the auxiliary ramp 99.

Hingedly connected to the rear crossbar 87 of the front ramp section 85 is a rearward ramp section 105. This rearward ramp section is comprised of a forward crossbar 106 and a rear crossbar 107 together with sidebars 108 and 109, as shown in FIG. 6. Hinges 110 and 111 pivotally connect this rear ramp section 105 at its forward edge to the rear end of the forward ramp section 85. As shown, the hinges are welded to the front crossbar of the rear ramp section 105. Struts 112 and 113 are spaced transversely of the truck and extend between the forward and rear crossbars 106, 107 of the rear ramp section 105 and are of a construction similar to that of the struts 90 and 91 of the forward ramp section 85. Louvers 114 extend between the sidebars and the struts 112 and 113, as shown. These louvers are provided to facilitate the passage of dirt, etc., through the rear ramp section 105 and thereby avoid the same being carried onto the upper surface of the truck bed 30.

As can be readily seen by reference to FIG. 6, the rearward ramp section extends laterally beyond the sidebars 88 and 89 of the forward ramp section 85. The forward ramp section is 96 inches long, while the dimensions of the rear ramp section, taken longitudinally of the truck, is only 15 inches long. Thus, the forward ramp section is 5–7 times as long as the rear ramp section.

As also shown in FIG. 6, a pair of straps 115 and 116 which carry connectors 117 and 118, respectively, are secured to the opposite ends of the rear ramp section 105 and are adapted to be connected to the pins 35 and 36 of the truck when it is desired to utilize ramp section 105 as an endgate for the truck.

FIGS. 20–26, inclusive, show a latch mechanism 120 which is carried by the rear ramp section 105. FIG. 20 shows this latch mechanism generally while FIGS. 21–26, inclusive, show the details thereof. As shown, a handle 121 is pivotally mounted upon the rear frame section 105 at a point intermediate its ends upon a mounting 122 provided for that purpose. Depressor arms 123 and 124 are pivotally mounted on the mounting 122 at opposite ends thereof. Only one of the mountings, however, is shown for the sake of brevity, and can be seen at the righthand side of the handle as viewed in FIG. 21. As shown, it includes a pivotal mounting for a spring 125 which urges the pressure arms upwardly.

When the handle 121 is lifted, the depressor arms 122 and 123 are pivoted downwardly and force the outer ends of a pair of angulated retractor arms 126 and 127 to pivot about their joint pivot 128 and thereby cause the lower ends thereof to be drawn toward each other. The extent of such movement is limited by a movement limiting pin 129 which is carried by the mounting 122 and extends outwardly through a slot such as is identified by the numeral 130 in FIG. 21. Each of the retractor arms has such a slot 103 through which the pin 129 extends. A spring 131 is connected to the upper horizontal arms 126a, 127a of each of the retractor arms 126 and 127 so as to urge the lower ends of said arms outwardly.

A pair of connecting rods 132 and 133 are connected to the lower ends of the retractor arms 126 and 127, respectively, as best shown in FIG. 21 and serve to connect these arms to one of a pair of latching mechanisms 135 which are carried at the outer ends of the rear ramp section 105. For the sake of brevity, only one of said ramp sections will be described herein, since the opposite ramp section carried at the opposite end of the ramp section 105 is identical thereto.

Each of the latch mechanisms 135 have a housing 136 from which a pivot ear 137 extends outwardly therefrom toward the handle 121. A pivot pin 138 is carried by the uppermore portion of the pivot ear 137 and pivotally supports pivot plate 139 which, as shown, is connected by the connecting rod 132 to its respective retractor arm 126. A camming arm 140 extends outwardly from the pivot plate at a point approximately midway between the pivot pin 138 and the point of juncture of pivot plate 139 with the rod 132. Thus, when the rod 132 is retracted by the handle 121, the camming arm 140 moves downwardly and depresses a pivotally mounted locking member 141 which extends laterally from a pivotally mounted disk 142. The latter is pivotally mounted, as shown, and has a flat upper camming surface 144 which extends horizontally and at right angles to its vertically extending locking surface 145. Pivot pin 146 pivotally supports the disk 142 and also mounts a spring 147 which urges plate 141 upwardly in a counter-clockwise direction. As shown, the camming arm 140 bears upon the flat upper surface of camming plate 141 and operates against the urging of spring 147.

Figure 24:
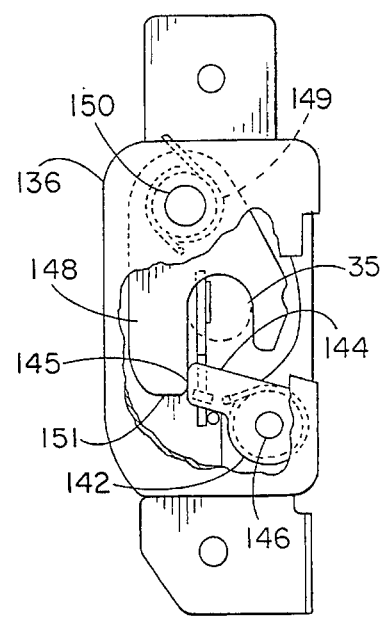
FIG. 24 is an elevational view of the latch on the rear ramp in latched position.
Figure 25:
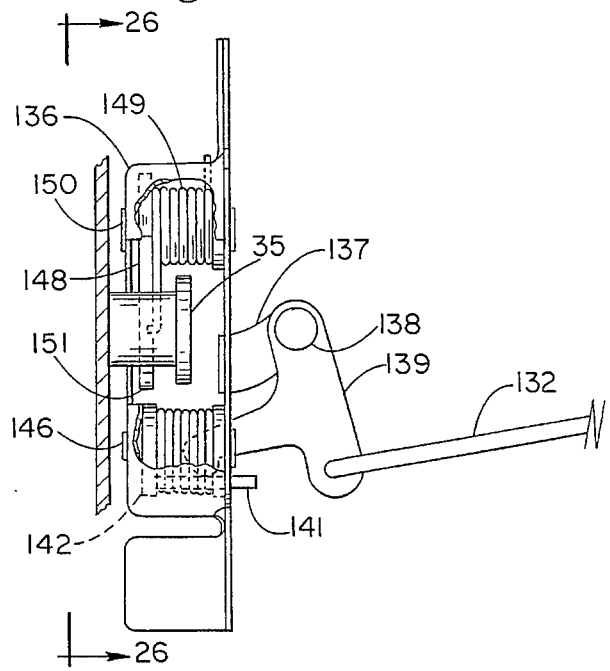
FIG. 25 is an elevational view of the latch on the rear ramp, in a latched position.
Figure 26:
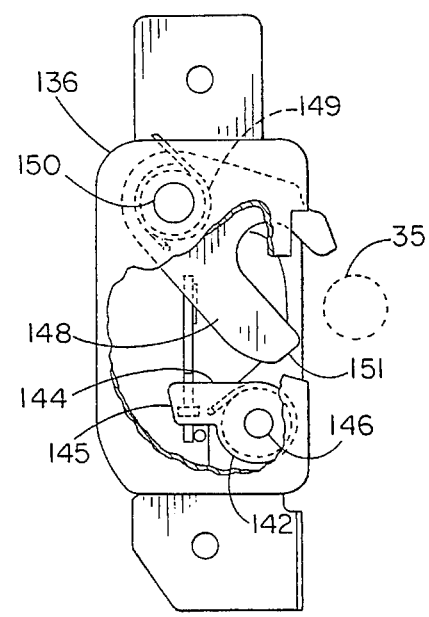
FIG. 26 is an elevational view of the latch on the rear ramp in an unlatched position.

Pivotally mounted in the upper portion of the housing 136 is a latch member 148 which has a configuration best seen in FIG. 24. As shown, spring 149 is mounted on pivot pin 150 and urges latch member 148 in a counter-clockwise direction as viewed in FIG. 26.

Camming surface 151 forces disk 142 to pivot in a counter-clockwise direction against spring 147 when the latch member 148 is struck by the outwardly extending latch pin 35, 36, as the rear ramp section 105 is swung to a vertically extending position, after the loading operation has been completed and the forward ramp section is entirely disposed within the confines of the frame assembly. As latch member 148 moves to the left as viewed in FIG. 26, camming surface 151 depresses camming surface 144 until camming surface 151 moves beyond the outer end of disc 142 and its locking surface 145, at which point disc member 142 snaps into its locking position shown in FIG. 24.

The two ramp sections 85 and 105 each carry aligned tubular members which are formed of heavy metal and are disposed in near abutting position when the rear ramp section 105 is lowered so as to extend in the same plane as the forward ramp section 85. As best seen in FIG. 6, the tubular members 152 and 153 of the forward ramp section are welded to the outer surface of the two struts 91 and 92. The two tubular members 154 and 155 of the rear ramp section 105 are welded to the outer surfaces of the two struts 112 and 113 in aligned relation to tube 152, 153. Slidably mounted within the two tubular members 112 and 113 are two locking pins 156 and 157 which, when moved to their forwardmost position, extend into one of the two aligned metal tubes 152 and 153 so as to the hold the rearward ramp 105 in rigid extended planar position relative to the forward ramp 85. When the ramps are so extended and secured in loading position, a vehicle can be caused to be driven upwardly over the two ramps without any buckling thereof. The individual locking pins 154 and 155 can be rotated about their longitudinal axis when moved to their forwardmost position so as to lock the same in latched position within a slot (not shown) which is provided for that purpose in the rear end of each of the metal tubes 154 and 155.

When it is desired to load vehicles into the rear end of the truck T, the rear ramp section 105 is released by pulling upwardly upon the handle 121. This causes the connector rods 132, 133 to draw the lower end of the pivot plate 139 toward the handle, which in turn causes the camming arm 140 to press downwardly upon the camming plate 143. This causes disk 142 to pivot against the urging of spring 147 and moves the latching surface 145 of the disk downwardly to release latch member 148, and the latch pins 35 and 36 of the rear ramp section 105. As a consequence, the latter can be swung downwardly to a horizontal position at which it is maintained by the straps 87 as shown in FIG. 5. When these straps are released from the pins 39, and the rods 156 and 157 are moved forwardly into the tubular members 152 and 153 and locked into position, the entire assembly can be moved rearwardly, drawing the forward ramp section 85 to an extended and loading position with the rear crossbar 107 of the rear ramp section 105 bearing upon the ground. The vehicle or vehicles may then be driven upwardly over the two ramp sections and into the rear box portion of the truck above its bed 30. After the vehicles have been loaded, the forward ramp section 85 can be elevated to a horizontal position and moved forwardly to its loaded position, at which the lock pins 62 and 63 can be inserted into the openings provided for that purpose at the rear end of the forward ramp section 85. The rear ramp section 105 can then be swung upwardly to a position where the latch pins 35 and 36 engage the pivotable latching members 148 and drive them rearwardly from the position shown in FIG. 26 to the position shown in FIG. 24. As the latch member 148 is caused to pivot about its pivot pin 150, as described, the lower camming surface 151 thereof engages the upper surface 144 and causes the disk 142 to pivot from the position shown in FIG. 26 to a depressed position until the camming surface 151 of the latch member 148 moves beyond the outer end 145 of disc 142, which functions as a locking surface as it snaps into the position shown in FIG. 24. Thus, the latch member 148 is held in latching position indefinitely until such time as the handle member 121 is activated.

When it is desired to unload the vehicles, the handle member is activated, which causes the connector rods 132 and 133 to draw the lower end of the pivot plates 139 toward the handle member. This causes the camming arm 140 to depress the camming plate 143 which in turn causes the disk 142 to pivot downwardly and release the latch member 148, which is urged toward the right as viewed in FIG. 24, to thereby free the latch pins 35 and 36 and permit the rear ramp section 105 to swing outwardly and downwardly to a horizontal position, at which the locking rods 155 and 156 can be moved forwardly to extend into the tubular members 152 and 153 of the front ramp section 85. The entire assembly can then be drawn rearwardly until the hook members 93 and 94 engage the abutment members 54 and 55 of the frame assembly at which point the rear ramp section 105 and the rear end of the forward ramp section 85 can be lowered until the rear crossbar 107 of the rear ramp section 105 rests upon the ground. Then the vehicles can be readily unloaded by merely running them rearwardly over the two ramp sections.

Before either of the loading or unloading operations, the auxiliary ramp 99 is swung upwardly and forwardly to a position at which its forward edge extends over and slightly beyond the juncture between the forward end of the forward ramp section and the rear end of the truck bed. This provides a strengthened ramp area with additional improved gripping surface (not shown) carried by the underside of the auxiliary ramp 99 to facilitate the loading operation.

From the above it can be seen that I have provided a novel and compact ramp assembly comprised of only two sections, one of which functions as an endgate for the pick-up truck. This provides improved safety in transporting and loading and unloading such vehicles and a greatly improved appearance. More importantly, however, it greatly facilitates the loading and unloading of such vehicles, such as snowmobiles, and saves time, labor and effort. In addition, its unique construction greatly diminishes the amount of snow or mud which would normally be carried by such vehicles into the interior of the box of the truck. It is both strong and durable and relatively inexpensive to construct, while at the same time requiring a minimum of effort on the part of the owner in effectively utilizing the same.

It will, of course, be understood that various changes may be made in the form, details, arrangement and proportions of the parts without departing from the scope of the invention which consists of the matter shown and described herein and set forth in the appended claims.

I claim:

1. A truck having vehicle loading and unloading apparatus mounted thereon, comprising:
   a. a pick-up truck having an elongated load-bearing bed with opposite sides at its rear-end portions;
      i. said pick-up truck having an upstanding rearwardly extending side wall disposed at each of said opposite sides of said bed;
      ii. each of said side walls having latch means at its rear-end for securing one end of a tailgate normally carried by such a pick-up truck;
   b. a generally rectangular elongated rigid frame assembly fixedly and rigidly secured to said bed in superimposed relation thereto and extending longitudinally thereof;
      i. said frame assembly having a pair of laterally spaced parallel slideways each being adjacent opposite sides of said frame assembly;
   c. a platform fixedly mounted upon said frame assembly in superimposed relation thereto;
   d. two only ramp sections pivotally connected in tandem relation, one of said ramp sections being disposed forwardly of the other and slidably mounted within said slideways for limited sliding relative movement longitudinally of said frame assembly between a forward, retracted loaded position and a rearwardly extending loading position;
   e. means carried by said frame assembly at its rear end portions for arresting rearward movement of said ramp sections as said sections reach loading position, and for permitting downward pivoted movement of said sections relative to said frame assembly into the loading position;
   f. means associated with said two ramp sections for releasably securing same in extended planar relation while in the loading position; and
   g. latching means carried by said rearmost ramp section for cooperating with said latch means of said sidewalls for securing said rearmost ramp section in an upright position while said ramp sections are in the retracted loaded position, whereby said upright ramp section will function as an end gate for said pick-up truck.

2. The structure defined in claim 1 and:
   (h) a pair of angulated rigid brace members;
   (i) a pair of socket members, one each of which is carried by each of said opposite sides of said pick-up truck adjacent its said rear-end portions for receiving one portion of one of said angulated brace members therein to effectively brace and hold said brace assembly in proper position relative to said bed.

3. The structure defined in claim 1 wherein longitudinal dimensions of a forward-more ramp section are in excess of five times the longitudinal dimensions of a rearward-more of said ramp sections.

4. The structure defined in claim 1 wherein each of said slideways is lined with a high-density plastic liner beneath portions of said forward-more ramp section to facilitate movement thereof within said slideways.

5. A loading device for loading and unloading vehicles into and from a bed of a pick-up truck comprising:
   a. a generally rectangular elongated rigid frame assembly constructed and arranged to be fixedly and rigidly secured to the bed of a pick-up truck in superimposed relation thereto;
   b. a platform fixedly mounted upon said frame assembly in superimposed relation thereto;
   c. said frame assembly having a pair of laterally spaced parallel slideways, each being adjacent one side of said frame assembly;
   d. a pair only of ramp sections pivotally connected to each other in tandem relation, one of said ramp sections being disposed forwardly of the other;
   e. the forward one of said ramp sections being mounted within said slideways for limited sliding relative movement longitudinally of said frame assembly to and from a rearwardly extending loading position;
   f. pivot means associated with said slideways and forward end portions of said forward ramp section for pivotal movement of said forward ramp section about a transverse horizontal axis;
   g. releasable means associated with said two ramp sections for releasably securing the same in extended planar relation for use in extended loading position;
   h. means carried by the rearward one of said ramp sections for securing same in an upright position to the rear-end portions of a pick-up truck when said forward ramp section is in a forwardmost position within said slideways, whereupon said upright ramp section will function as a tailgate for the pick-up truck while said ramp sections are in a retracted loaded position.

6. A loading device for loading and unloading vehicles into and from a bed of a pick-up truck comprising:
   a. a generally rectangular elongated rigid frame assembly constructed and arranged to be fixedly and rigidly secured to the bed of the pick-up truck;
   b. said frame assembly having a pair of laterally spaced slideways each being adjacent opposite sides of said frame assembly;
   c. said slideways having rear-end portions disposed adjacent rear-end portions of said frame assembly;
   d. a pair only of ramp sections pivotally connected to each other in tandem relation, one being forward of the other;
   e. a forwardmost one of said ramp sections being slidably mounted within said slideways for limited sliding relative movement longitudinally of said frame assembly to and from a rearwardly extending loading position;
   f. pivot means carried adjacent a front end of said forward ramp section, and permitting downward pivotal movement thereof about a transverse horizontal axis located adjacent its said front end, when in a rearward extended loading position;
   g. the axis of pivot between said ramp sections being disposed adjacent said rear-end portion of said slideways when said ramp sections are in a loaded position;
   h. said rearwardmore ramp section extending upwardly from said axis of pivot in generally vertical orientation when in the loaded position; and
   i. means associated with said two ramp sections for releasably securing the same in extended planar relation for use in the extended loading position.

7. The structure defined in claim 6 and
   (j) a platform fixedly mounted upon said frame assembly in superimposed relation thereto.

8. The structure defined in claim 6, and
   (j) means carried by said more rearward ramp section for securing the same in said upright position to a rear-end portion of a pick-up truck whereupon said upright ramp section will function as a tailgate for the pick-up truck while said ramp sections are in retracted loaded position.

9. The structure defined in claim 6, and:
   (l) an auxiliary ramp section pivotally mounted on said forward-most ramp section adjacent a forward end thereof in position to swing forwardly from a flat superimposed rearwardly extending inoperative position relative to said forward-more ramp to a forwardly extending operative position at which it extends forwardly over the rear end portion of said platform when said ramps are in the extended loading position.

10. The structure defined in claim 6, wherein the longitudinal dimensions of the forward-most of said ramp sections are in excess of five times a longitudinal dimensions of the rearward-more of said ramp sections.

11. The structure defined in claim 6 wherein said ramp sections are devoid of supporting leg structure.

12. The structure defined in claim 6 wherein said frame assembly has forward and rearward end portions and an upstanding connector ball fixedly secured to said forward end portion of said frame assembly, said connector ball being a ball portion of a ball and socket towing hitch.

13. The structure defined in claim 6 wherein each of said slideways is lined with a high-density plastic liner beneath portions of said forward-more ramp section to facilitate movement of the latter within said slideways.

14. The structure defined in claim 6 wherein said forward-more ramp section has opposite laterally spaced sides and a longitudinally extending rail at each of said forward ramp sections sides extending into one of said slideways of said frame assembly to facilitate forward and rearward sliding movement of said forward ramp section relative to said frame assembly.

15. The structure defined in claim 6 wherein at least one of said ramp sections is of louvered construction.

16. The structure defined in claim 6 wherein each of said ramp sections is of louvered construction.

* * * * *